United States Patent Office 3,561,042
Patented Feb. 9, 1971

3,561,042
HOG SKINNING IMPROVEMENT
Francis Glenn Connick, Downers Grove, Ill., assignor to Swift & Company, Chicago, Ill., a corporation of Delaware
No Drawing. Filed May 26, 1969, Ser. No. 827,971
Int. Cl. A22b 5/16
U.S. Cl. 17—50                                6 Claims

ABSTRACT OF THE DISCLOSURE

An improved process for removing the skin from a hog carcass comprising the steps of hand skinning the mid-ventral area and then subjecting the said carcass to a blast of chilled air until the fat layers beneath the skin become sufficiently firmed that the skin may be removed in a whole piece with little, if any, fat adhering to the said removed skin.

---

This invention relates to the slaughtering art, and more particularly relates to an improved method for skinning hogs. The present invention provides for the use of an interfaced chilling concept to be integrated into skinning of hog carcasses whereby substantially all, or a major portion, of the skin is removed in one piece and the layers of fat are retained on the carcass.

The removal of the skin of hogs has been a problem to those skilled in the art for some time. This is mainly due to the nature in which the hog's skin is physically attached to the carcass proper. The skin is attached to the carcass by a pebble-grained double layer of fat with pockets of fat protruding into the skin. This double layer of fat consists of a firm outer fat layer that is interlaced with proteinaceous fibers and an underlining soft, younger layer of fat that is attached to the carcass proper.

When the hog skin is removed by physical stripping, either mechanically or otherwise, the soft fat layer usually tears and pulls loose from the carcass and thereby is left attached to the adjacent firm layer of fat which is attached to the skin. This results in a loss of fat from the carcass and an excess of such upon the removed skin. Whereas the fat is a desirable protective layer and end product upon the carcass, it is an undesirable waste if attached to the removed skin. Excess fat reduces the value of the skin as a leather or collagen raw material, for it results in a necessity of further processing to remove the fat from the skin. Accordingly, the value of the fat as a separate product or protective layer is lost as waste.

Because of the many difficulties and disadvantages associated with the skinning of hog carcasses, the general practice has been to leave the skin on the carcass until the carcass has been cut into its primal parts. Through this practice, the carcass is immersed in a scalding tank to dissolve the cementing proteins and soften the adjacent tissue around the hair follicle. The bulk of the hair is removed mechanically by a beating action and that remaining is removed by singeing or shaving. The carcass is then cut into its primal parts. The skin is subsequently removed in pieces from the primal parts by hand or mechanical skinning. Costs of such skin removal are quite high, considering the time and amount of skilled labor required for such removal.

The value of the skin removed in this practice is quite low, for the skin has been damaged by the hair-removal processes and has been cut into small pieces. The only probable value of such skin is as a gelatin or tankage raw material.

Warm skinning methods by physical stripping of the skin, mechanically or otherwise, from the carcass while the carcass is warm with body heat incorporates disadvantages also, due to the soft fat layer pulling loose from the carcass proper as described hereinbefore. Furthermore, it has been observed that warm skinning by physical stripping has a tendency to destroy a great percentage of the conformation of the bacon belly in the mid-thoracic and adjacent belly area which causes a loss of value to one of the more valuable parts of the carcass.

It is, therefore, an object of the present invention to provide an improved method for skinning hogs whereby substantially all, or a major portion, of the skin is removed in one piece from the carcass without extensive amounts of fat adhering to the skin, thereby increasing the value of the carcass proper and the skin as separate products.

It is another object of the present invention to provide an improved process of splitting and skinning the mid-ventral area of the hog that will assure conformation of the belly portion of the mid-thoracic and adjacent belly area to be used as bacon.

It is a further object of this invention to provide an improved method for removing the skin from hogs whereby the skin has an increased value as a leather or collagen raw material due to lack of adhering fat, large size, and minimum damage from harsh processing steps.

Additional objects and advantages, if not specifically set forth herein, will be readily apparent to on skilled in the art from the following detailed description.

This process makes possible the rapid processing of hog carcasses by removal of substantially all, or a major portion, of the skin as one piece. The removed skin has little, if any, fat attached to it thereby enhancing its commercial value. Generally, the process is carried out by taking the carcass of a slaughtered hog, washing the exterior to remove contaminates, and either severing the head from the carcass or retaining it. The process may include scalding and dehairing steps but these are not preferred for these steps tend to damage the skin and reduce its value as a raw material. The skin is split along the mid-ventral line of the hog and hand-skinned in the mid-thoracic and adjacent belly area. The carcass is then placed in a stream of chilled air and the skin is blast-chilled until the double layer of fat is firmed to such an extent that the skin may be separated, either manually, mechanically, or otherwise from the carcass proper with ease and without the fat adhering to the skin.

It has been found that the blast-chilling firms the double fat layer on the carcass which allows the skin to be separated without any of the fat adhering to the skin. This results in a more desirable skin that requires less processing to be used as a raw material and a more desirable carcass.

While the present invention may be practiced either with or without severence of the head of the hog from the carcass, it is preferred that the head be retained for several parts (cheeks, ears, palate, etc.) have value as edible products. Additionally when the head is retained on the carcass for edible purposes it may be desirable to remove the hair from the skin for many edible parts of the head are distributed with the skin attached. If it is desired to remove the hair from the head, the head may be dipped into a scalding tank for 4 to 12 minutes at a temperature of about 135° to 143° F. to enhance easy removal of the hair. The hair may then be removed by one of the several removal methods commonly known in the art.

More specifically, a preferred embodiment of the invention provides that the slaughtered animal is first hand skinned along the mid-ventral line to retain conformation of the belly portion used as bacon. This step is carried out in the process by splitting the skin along the mid-ventral line from the forequarter to the hindquarter sections and slitting at the fore and hind quarters radially to the hocks and/or feet. The carcass is then partially hand skinned starting from the split mid-ventral line toward the thoracic cavity and outward until the skin has been separated from the belly portion and in the mid-thoracic area.

The present method also provides that the fore and hind quarters may be skinned from the radial split outward until the skin on the medial sides is separated. This will enhance easy removal of the skin from the carcass as a whole piece.

However, it may be desirable to leave the skin upon the fore and hind quarters for many hams and primal cuts from these areas are customarily processed and sold with the skin retained upon them. If this procedure is desired, the skin upon the fore and hind quarters is not split radially when the mid-ventral split is made, but the skin is split from the mid-ventral line outward and around each quarter section instead.

The skin and underlying fat are then rapidly chilled to firmness as by being subjected to a blast of chilled air to facilitate easy removal of the skin from the carcass. It has been found that a rapidly moved large volume of chilled air directed against the carcass induces a quick lowering of the skin temperature and causes the pebble-grained double fat layer to firm quickly. The blast of chilled air may be produced by the use of any means that will rapidly move a large volume of chilled air sufficient to induce a quick lowering of skin temperature. In carrying out a preferred embodiment of the invention, the carcass is placed adjacent to a fan in a freezing unit and exposed to the blast of chilled air. A floor fan that produces an air movement of about 1,000 to 1,500 c.f.m. is satisfactory. The air blast temperature is preferably about −20° F. The carcass is subjected to the blast chill in all directions until the double fat layer is firmed up and the skin may be separated at the interface of the pebble-grained fat and the skin underside. It has been found that this occurs when the carcass has been subjected to a blast chill of about −20° F. and 1,000 to 1,500 c.f.m. for an exposure of about 5 to 20 minutes. During this exposure time, it has been found that the skin temperature of the hog carcass will drop to an end temperature of about 80° to 32° F.

The exposure time and skin temperatures may vary between the hereinabove mentioned ranges, depending upon the size of the individual carcass and the time expired after kill. The specific moment to remove the skin from the carcass proper has been determined to be when the firmed pebble-grained double layer of fat will easily separate from the underside skin layer.

After the above condition of easy separation is noted, the skin is pulled off the carcass, either manually or by one of any number of mechanical stripping devices known in the art. As the skin is pulled, the carcass and the fat layer-skin interface is continually exposed to the blast chill to assure easy separation. After the skin is completely removed, the carcass is ready for additional steps of processing.

EXAMPLE

A 180 pound dressed weight hog is slaughtered and hung by the hind legs. The head was severed at the cervical section and the skin was slit along the mid-ventral belly line from the forequarter to the hindquarter. The skin was slit radially from the mid-ventral slit along said each fore and hind quarter to the hock. The belly area was hand-skinned on both sides of the mid-ventral line to the thoracic cavity. Also, the medial sides of the fore and hind quarters were hand-skinned outward to the lateral sides. The carcass was placed adjacent to a floor fan in a freezing unit to simulate a blast chill unit with a chill temperature of about −20° F. and an air movement of about 1,000 to 1,500 c.f.m. The total skin area of the carcass was subjected to the blast chill until the pebble-grained fat layer and the inner skin easily separated, which occurred at about 36° F. after 10 minutes.

The skin was pulled, starting at the hock of the hind quarters as the blast chill was continuously directed toward the carcass and the fat layer-skin interface and continued until the skin was completely removed. The removed skin existed as a whole piece with little, if any, fat attached to the underside in those areas where the skin was pulled from the carcass.

While in the foregoing specification, a detailed description of a preferred embodiment of the invention has been set down for the purpose of explanation thereof, many variations in the details herein may be made by those skilled in the art without departing from the spirit and scope of the invention.

I claim:
1. The process for removing the skin from a hog carcass comprising: slitting said skin along a mid-ventral line from a forequarter section to a hindquarter section; chilling said skin and the underlying double fat layer until said fat layer beneath said skin becomes sufficiently firmed so that the skin may be easily parted therefrom; and pulling said skin away from the fat layer until it is separated from said carcass.

2. The process of claim 1 wherein the said mid-ventral area is first hand skinned from the mid-ventral line of the mid-thoracic and adjacent belly area outward until a portion of said skin has been separated from the belly portion.

3. The process of claim 1 wherein said carcass is subjected to a blast of chilled air.

4. The process of claim 3 wherein the carcass is blast chilled with a stream of chilled air of about 1,000 to 1,500 c.f.m. and a temperature of about −20° F.

5. The process of claim 3 wherein said carcass is subjected to a blast of chilled air for about 5 to 20 minutes.

6. The process of claim 3 wherein said carcass is subjected to said blast of chilled air until the skin temperature of said carcass is reduced to an end temperature of about 80° F. to 32° F.

References Cited

UNITED STATES PATENTS

| | | | |
|---|---|---|---|
| 2,654,122 | 10/1953 | Derby | 17—50 |
| 2,715,749 | 8/1955 | Coughenour | 17—47 |
| 3,308,502 | 3/1967 | Bednarz et al. | 17—21 |
| 3,408,688 | 11/1968 | Sparks | 17—50 |

LUCIE H. LAUDENSLAGER, Primary Examiner